Aug. 11, 1959     F. W. LIVERMONT     2,898,826
PAVING MACHINE
Filed April 23, 1956     8 Sheets-Sheet 1
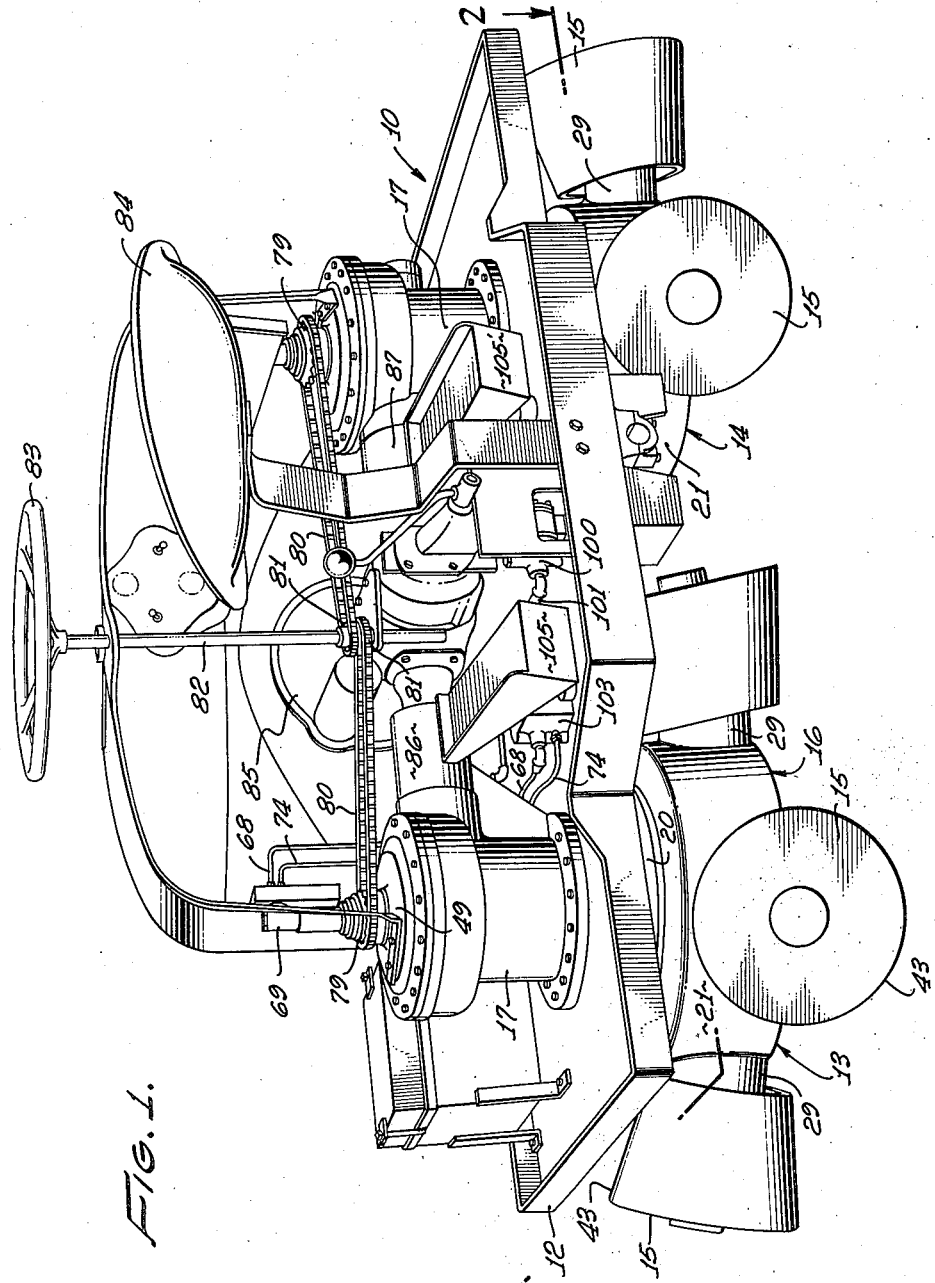
FRANK W. LIVERMONT
INVENTOR.
BY *Lyon & Lyon*
ATTORNEYS.

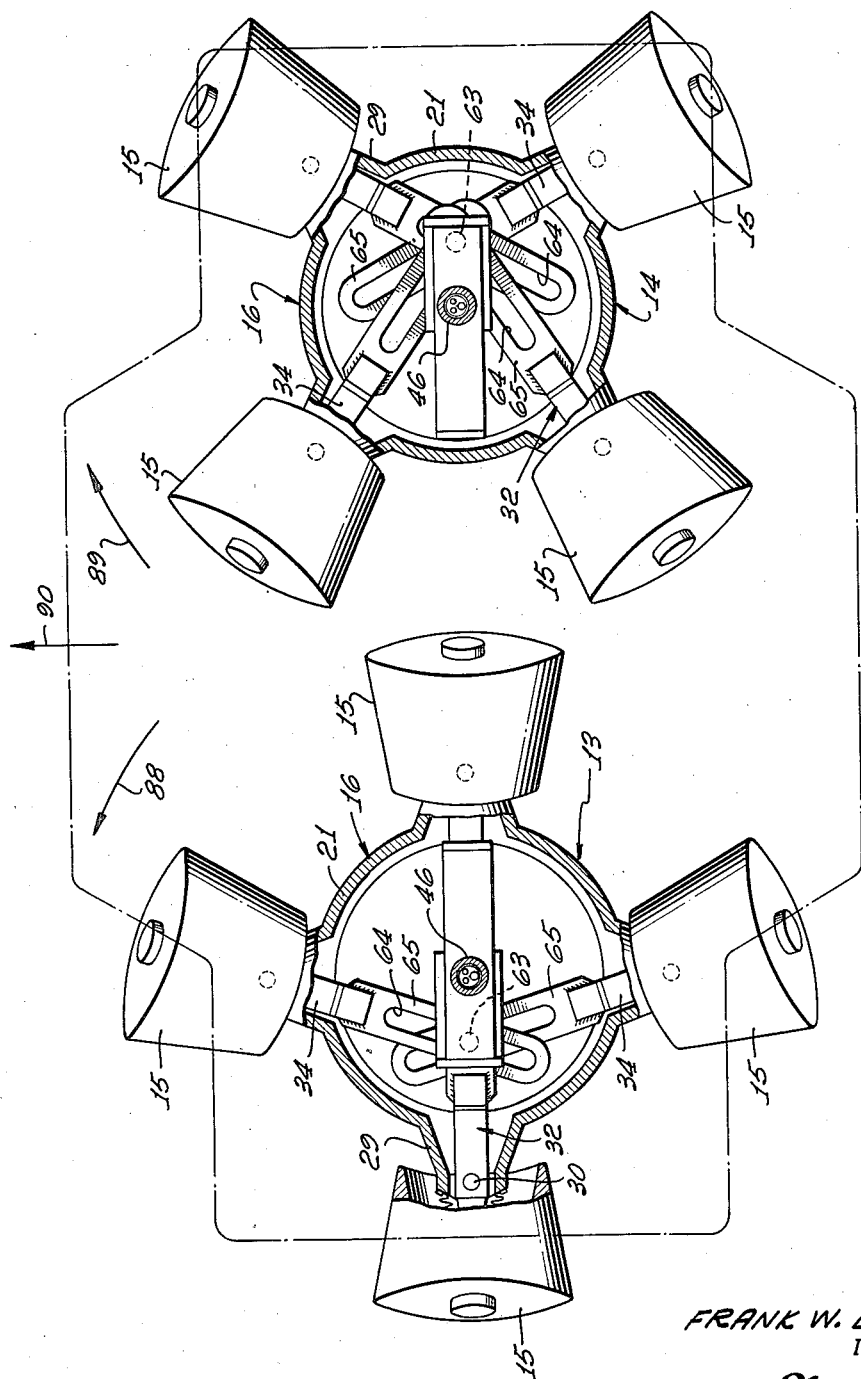

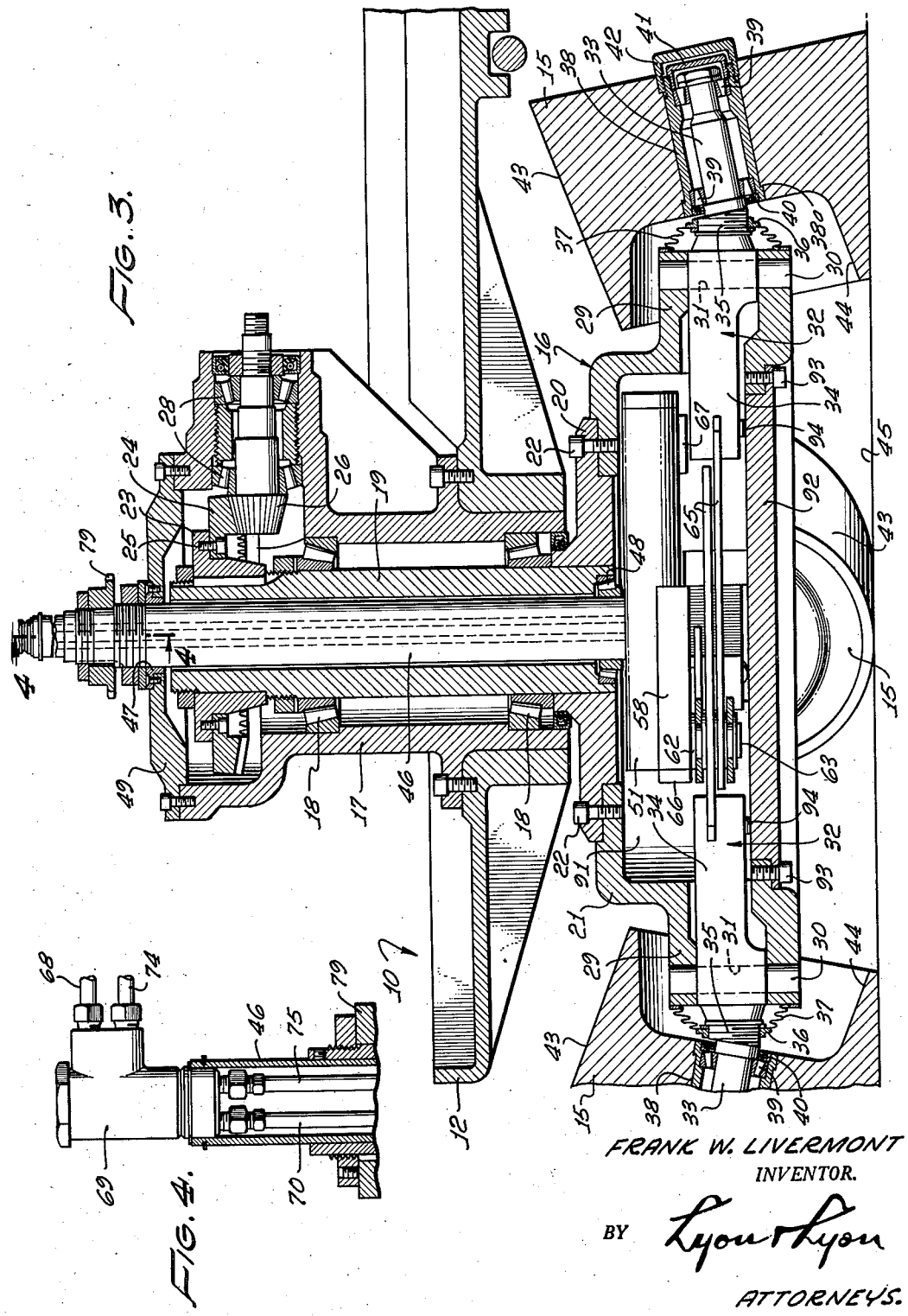

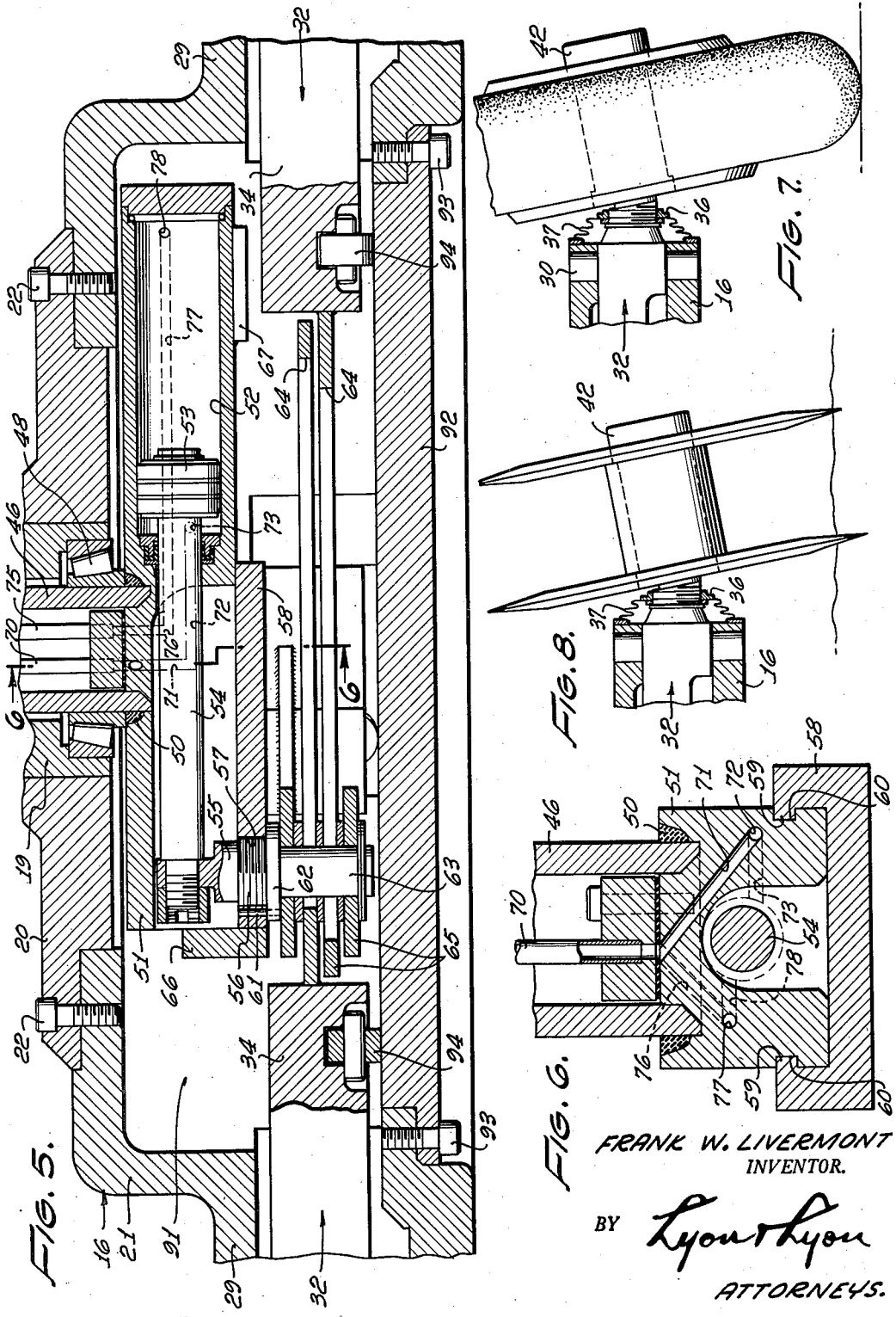

Aug. 11, 1959     F. W. LIVERMONT     2,898,826
PAVING MACHINE
Filed April 23, 1956     8 Sheets-Sheet 6
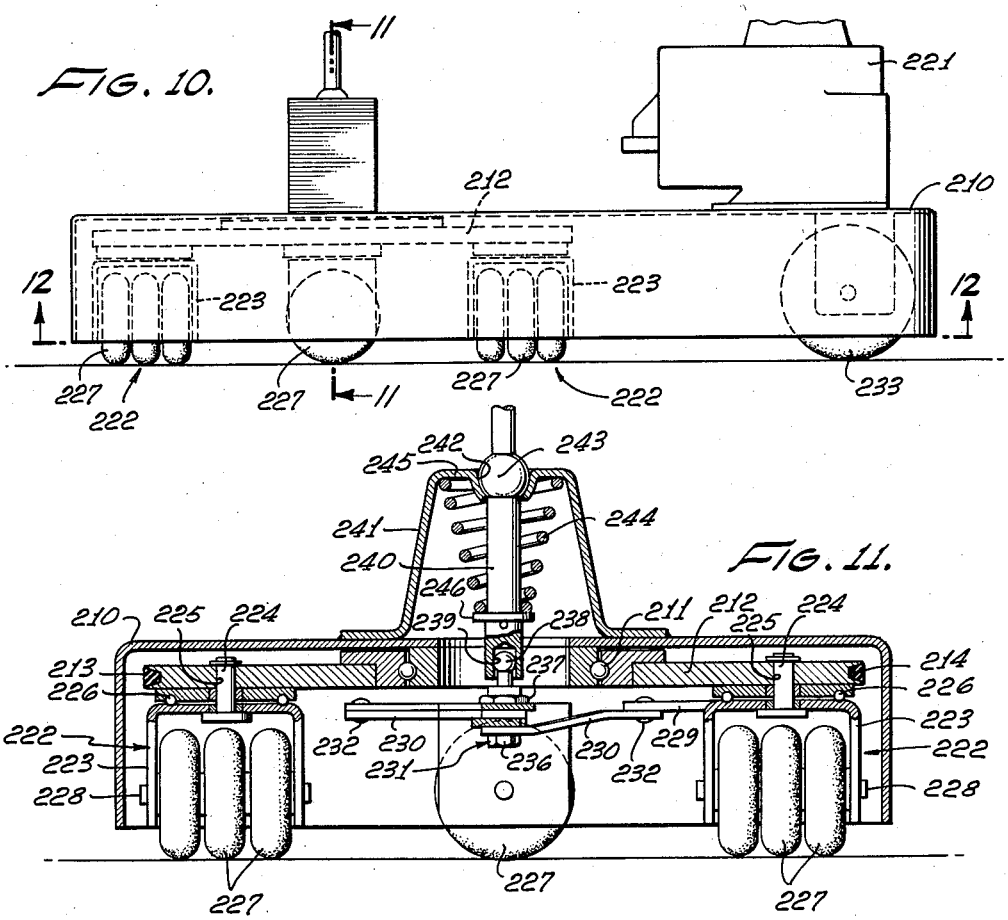
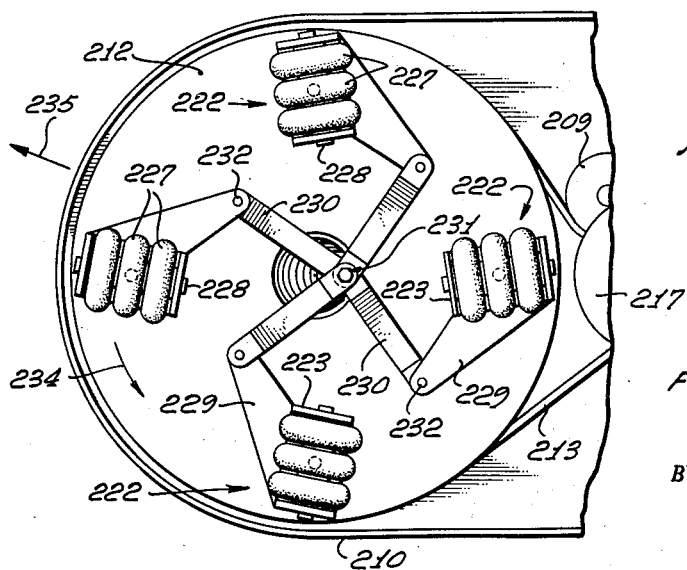
FRANK W. LIVERMONT
INVENTOR.
BY *Lyon & Lyon*
ATTORNEYS.

Aug. 11, 1959 F. W. LIVERMONT 2,898,826
PAVING MACHINE
Filed April 23, 1956 8 Sheets-Sheet 7

FRANK W. LIVERMONT
INVENTOR.

BY Lyon & Lyon
ATTORNEYS.

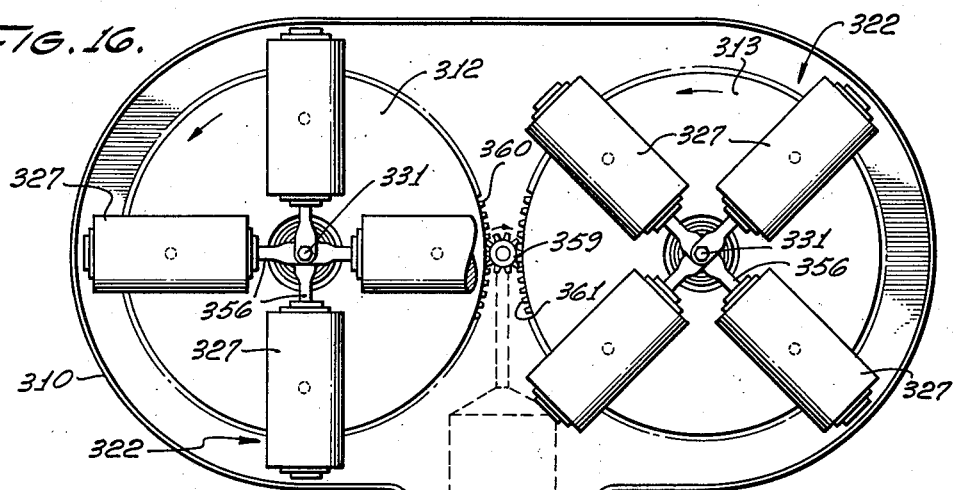
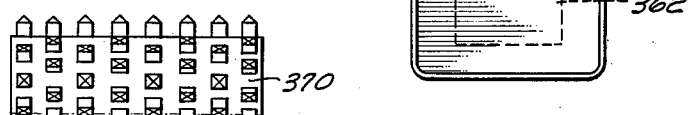
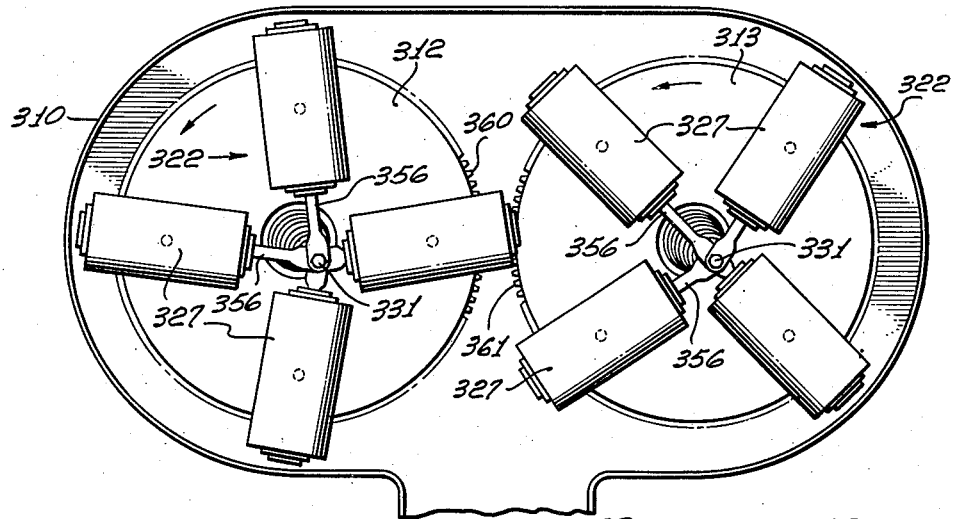
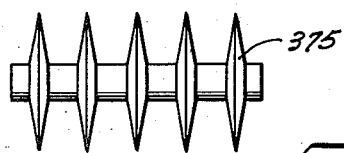

United States Patent Office
2,898,826
Patented Aug. 11, 1959

2,898,826

PAVING MACHINE

Frank W. Livermont, Monrovia, Calif.

Application April 23, 1956, Serial No. 579,801

20 Claims. (Cl. 94—45)

This invention relates to a novel form of paving device for use in road construction work, asphalt compacting, and the like. It is particularly directed to apparatus which includes a plurality of ground-engaging wheel or roller assemblies mounted on one or more horizontally rotating members, and wherein means are provided to cause the roller assemblies to have swiveling movement coordinated with rotation of the members to produce a beneficial compacting action, as well as to afford linear movement of the device in any desired direction.

The principal object of this invention is to provide apparatus including one or more rotary members, each member having a plurality of ground-engaging wheel or roller assemblies, together with means for controlling the swiveling movement of the said assemblies so that the frame supporting the rotary member may be caused to move linearly in any direction and at stepless increments of speed as desired.

Another object is to provide such a device in which the roller assemblies comprise rollers or casters and which are caused to turn about a "false axis" instead of the axis of the rotating member, thereby causing the supporting frame to "walk" in any desired direction or to remain in one position if desired.

Another object is to provide a device having more than one rotary member, each of the rotary members being provided with a plurality of roller assemblies.

Another object is to provide a paving and compacting device having novel means for changing the axis of rotation of the roller elements while they revolve on power driven rotary members.

Another object is to provide such a device in which the roller assemblies comprise caster wheels and wherein the path of movement of the caster wheels on one of the rotary members intersects and overlaps the path of movement of the caster wheels on another of the rotary members.

Another object is to provide devices of the general type described in which the caster wheels take the form of compactor rollers, toothed rollers, or disk assemblies.

Another object is to provide novel mechanism for shifting the axis of rotation of the caster wheels while the rotary members are revolving.

Other related and more detailed objects and advantages will appear hereinafter.

In the drawings:

Figure 1 is a perspective view showing a preferred embodiment of my invention.

Figure 2 is a sectional plan view taken substantially on the lines 2—2 as shown in Figure 1.

Figure 3 is a sectional elevation showing details of one of the rotary assemblies.

Figure 4 is a sectional detail taken substantially on the lines 4—4 as shown in Figure 3.

Figure 5 is a sectional elevation showing certain parts of Figure 3 on an enlarged scale.

Figure 6 is a sectional elevation taken substantially on the line 6—6 as shown in Figure 5.

Figure 7 is a sectional detail showing the use of pneumatic tired wheels instead of the type of compaction rollers illustrated in Figures 1–3.

Figure 8 is a sectional view showing the use of circular disks instead of the type of compaction rollers shown in Figures 1–3.

Figure 10 is a side elevation, partly broken away, showing another embodiment of my invention in diagrammatic form.

Figure 11 is a sectional elevation taken substantially on the lines 11—11 as shown in Figure 10.

Figure 13 is a view similar to Figure 12, and partly broken away, showing the caster wheel in position to cause "walking" or linear movement of the frame.

Figure 16 is a bottom plan view of the apparatus shown in Figure 15, the caster wheels or rollers being shown in neutral position to maintain the frame against movement.

Figure 17 is a view similar to Figure 16, showing the rollers in position to cause linear movement of the frame.

Figure 18 is a detail showing a modified form of caster wheel.

Figure 19 is a detail showing a further modified form of caster wheel.

Figure 9:
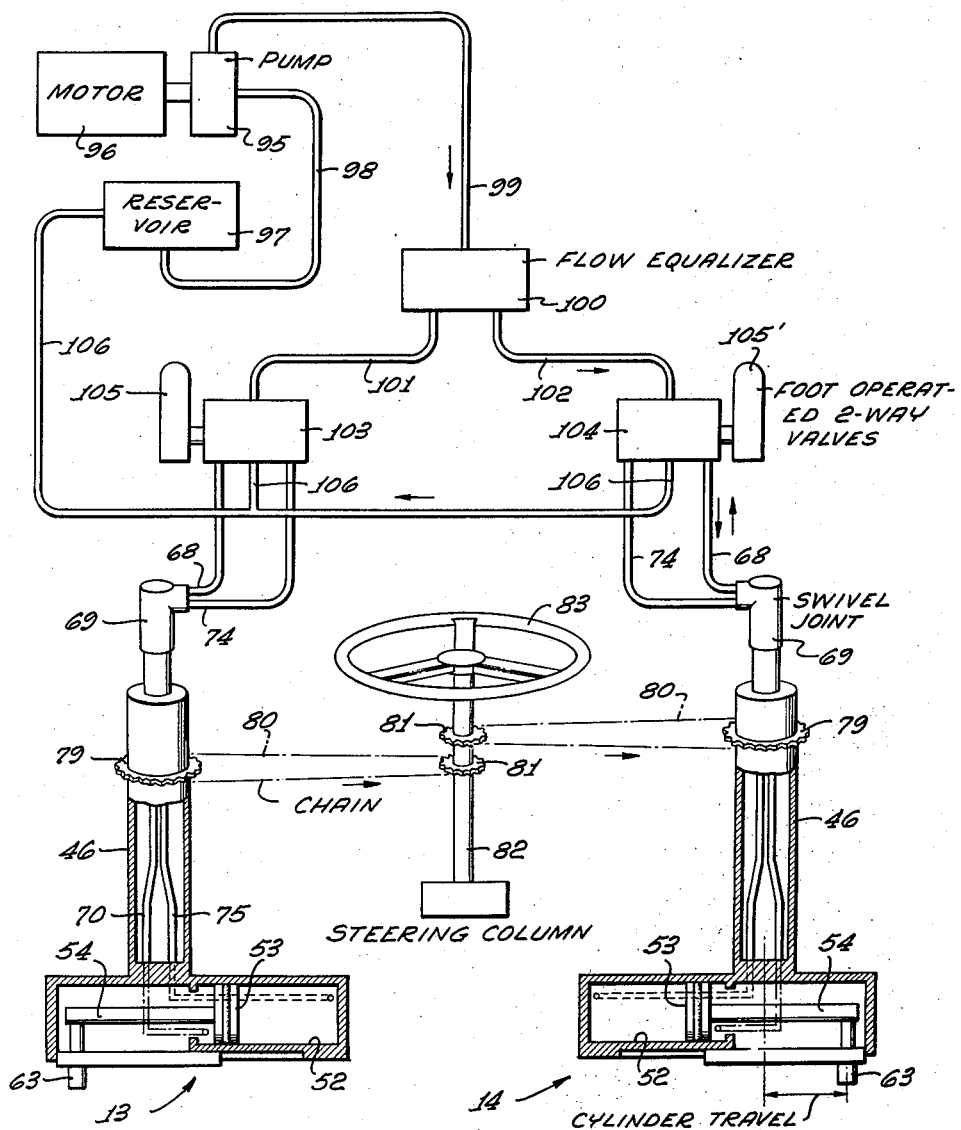
Figure 9 is a diagram showing the various hydraulic circuits.

Referring to the drawings, the paving machine generally designated 10 includes a frame 12 supported on rotary assemblies 13 and 14. Each of these assemblies includes a plurality of ground contacting rollers 15 mounted on a horizontally rotating member 16. The assemblies 13 and 14 are substantially duplicates and accordingly, only one need be described in detail.

The frame 12 supports a pair of flanged bearing housings 17 and these housings contain axially spaced bearings 18. The rotary member generally designated 16 includes a hollow spindle 19 which is carried in spaced bearings 18. A flange 20 is press-fitted or otherwise fixed on the lower end of the spindle 19, and is releasably secured to a bull ring 21 by means of a threaded element 22.

A drive ring 23 is connected to the upper end of the spindle 19 and is connected to the ring gear 24 by means of threaded elements 25. The ring gear 24 is engaged by a drive pinion 26 which is fixed to one end of a pinion shaft 27. This shaft is mounted in spaced bearings 28 carried on the stationary housing 17. From this description, it will be understood that turning the pinion shaft 27 serves to drive the ring gear 24 and rotary member 16.

The bull ring 21 is provided with outwardly projecting hollow bosses 29 at spaced locations around its periphery. A pivot pin 30 is fixed within each boss 29 and each of these pins is loosely received within the bore 31 of a trunnion element 32. Each trunnion element includes an outwardly extending axle portion 33 and an inwardly extending shank portion 34. The axle 33 preferably extends upwardly at a small angle. An intermediate portion of each trunnion element 32 between the shank 34 and axle 33 may be threaded as shown at 35 to receive a nut 36 to which is attached one end of a dirt excluding bellows 37. The other end of the bellows 37 is fixed to the bull ring 21. A hub 38 is mounted on each axle portion 33 and supported by means of axially spaced bearings 39. A seal ring 40 is provided to retain lubricant and to exclude foreign matter. A cap 41 engages the hub and serves as a closure for the outer ends of the axle portion 33. One of the rollers 15 is mounted on each hub and is clamped in position against the shoulder 38a by means of the clamping nut 42.

The compaction rollers 15 are each frustro-conical on their outer periphery 43 and each is provided with a recess 44 at the small end to provide clearance around the outwardly extending bosses 29 on the bull ring 21. It will be observed that the apex of the cone defined by each of the surfaces 43 does not lie on the axis of rotation of the rotary member 16, and hence the compaction rollers 15 do not have true rolling motion on the horizontal surface 45. Superior compaction characteristics result from this construction.

Means are provided for cyclically oscillating the trunnion elements 32 about the vertical pins 30 in coordination and timed relation with rotation of the member 16 about its vertical axis. As shown in the drawings, this means includes a control tube 46 positioned within the central opening in the spindle 19 and supported in spaced bearings assemblies 47 and 48. The bearing assembly 47 is carried on a stationary cap 49 and the bearing assembly 48 is mounted within the lower end of the spindle 19. Fixed to the lower end of the tube 46 as by welding 50 is a guide block 51 which is provided with a radial bore 52 to receive a sliding piston 53. A piston rod 54 extends through a packing assembly and carries a fitting 55 fixed to its extending end. This fitting 55 has a threaded portion 56 received in a threaded bore 57 provided in a horizontally movable slide 58. This slide 58 has parallel ribs 59 as shown in Figure 6 which slidably engage parallel grooves 60 provided in opposite sides of the fixed block 51. A pin 61 prevents relative turning movement of the fitting 55 within the threaded bore 57. A flange 62 on the fitting 55 engages the under side of the slide 58.

A downwardly projecting cylindrical pin 63 formed integrally with the fitting 55 extends through horizontal slots 64 provided in each of the trunnion extensions 65 (see Figure 2) fixed to each of the trunnion shanks 34. From this description it will be understood that movement of the piston 53 in the radial bore 52 serves to move the control pin 63 in a radial direction with respect to the axis of rotation of the rotary member 16.

When the piston 53 is fully advanced as shown in Figure 5, to bring the forward end of the slide 58 into contact with a stop element 66 on the guide block 51, the control pin 63 is placed at its maximum off-center position. When the piston 53 is retracted to bring the rearward end of the slide 58 into engagement with a stop member 67, the control pin 63 is moved to a position in which its axis coincides with the vertical axis of the rotary member 16.

Pressure fluid means are provided for advancing and retracting the piston 53 within the radial bore 52, and as shown in the drawings, this means includes a first passageway which communicates with the forward end of the bore 52 and a second passageway which communicates with the rearward end thereof. The first passageway includes conduit 68 connected to the rotary head 69 communicating with the conduit 70 within the control tube 46. The conduit 70 communicates with passages 71, 72 and port 73 formed in guide block 51. The second passageway includes conduit 74 connected to rotary head 69 and communicating with conduit 75 within control tube 46. Conduit 75 communicates with passages 76 and 77 and port 78 formed in guide block 51. Accordingly, the piston 53 can be advanced or retracted to any position within its range of movement by pressurizing one of the conduits 68 or 74 while venting the other.

The angular position of the guide block 51 and hence the angular position of the axis of the piston rod 54 with respect to the frame 10 is controlled by turning of the control tube 46. This turning action may be accomplished by means of a sprocket 79 fixed on the upper end of the tube 46 and turned by means of an endless chain 80. Each of the chains 80 is connected to a sprocket 81 fixed on a steering column 82. A steering wheel 83 is carried on the upper end of the column 82 in a position directly forward of a driver's seat 84. An internal combustion engine 85 is mounted on the frame and is provided with oppositely directed power take-off assemblies 86 and 87. Each of these assemblies is suitably connected by means (not shown) to drive one of the pinion shafts 27. The rotary assemblies 13 and 14 are therefore caused to turn at the same speed, and in opposite directions. Suitable throttle means (not shown) of conventional type are provided for regulating the speed of the internal combustion engine.

So long as the control pins 63 are in retracted position coincident with the axis of rotation of the assemblies 13 and 14, the rollers 15 simply revolve in place and the machine as a whole remains in the same position. When either or both of the pins 63 are moved to off-center position, however, the axle portions 33 of the trunnion elements 32 oscillate about the vertical pivot pins 30 so that the rollers 15 turn about the "false axis" of the control pins 63, although the rotary members 16 revolve about their respective vertical axes. The result is that each roller alternately, and in timed relation with the rotation of the member 16 about its vertical axis, turns about a short radius and a long radius causing the machine to "walk" or move in some direction with respect to the supporting surface 45. While each roller has a non-circular path the trend is in the direction controlled by the location of the control pins 63. The rotary assemblies 13 and 14 turn in opposite directions and therefore the piston rods 54 extend in opposite directions. As shown in Figure 2, the pin 63 is on the left side of the control tube 46 whereas the pin 63 on the assembly 14 is on the right side of the control tube 46. When the parts are in the position shown in Figure 2 and when the assemblies 13 and 14 turn in the direction indicated by the arrows 88 and 89, the entire machine moves in the direction indicated by the arrow 90.

It will be observed that the path of the rollers 15 on one assembly intersect the path of the rollers on the other assembly; interference is prevented by staggering the position of the rollers as shown in Figure 2. The overlapping feature of the roller assemblies enables the machine to operate upon and compact the entire surface over which it travels without leaving any central untreated zone.

A cavity 91 within the rotary member 16 is closed by means of a removable plate 92 secured by threaded fastenings 93. The upper surface of this closure plate 92 is contacted by antifriction rollers 94 mounted on each of the trunnion shanks 43. These antifriction rollers 94 serve to relieve the vertical pins 30 of much of the bending stress imposed by the load on the overhanging axle portions 33.

The diagram of Figure 9 shows the hydraulic circuits for advancing and retracting the pistons 53. A hydraulic pump 95 may be driven from a motor 96 or from the internal combustion engine 85. The pump draws fluid from a reservoir 97 through conduit 98 and delivers it through conduit 99 through a flow equalizer 100. The flow of fluid then passes equally through lines 101 and 102 to foot operated two-way control valves 103 and 104 respectively. Control pedals 105 and 105' regulate the flow rates to or from the conduits 68 and 74. A return line 106 leads from each of the valves 103 and 104 to the reservoir 97. The pedal 105 controls the position of the piston 53 in the assembly 13 and the pedal 105' controls the position of the piston 53 in the assembly 14. When the pedals are fully depressed the control pins 63 are advanced to the fullest extent in opposite directions as shown in Figure 9. If the pedals are fully retracted, the pins 63 are brought to a position coincident to the axis of their respective rotary assemblies 13 and 14. If one pedal is depressed farther than the other, the corresponding pin 63 is advanced to a greater extent than its counterpart on the other rotating assembly with the result that one side of the machine moves faster than the other causing the entire machine to turn relative to the supporting surface 45.

It will be observed that the chains 80 maintain a predetermined relationship between the piston rods 54 on the rotating assemblies 13 and 14, so that the piston rods also extend in opposite directions. This prevents the rotating assemblies 13 and 14 from attempting to "walk" in opposite directions. The extent of eccentric positioning of the control pins 63, however, may be independently adjusted by means of pedals 105 and 105' and in this way, the machine as a whole may be turned in one direction or the other under the control of the operator. The operator may thus cause the machine to move in any linear direction as well as causing it to turn to the right or to the left as desired.

When the machine is equipped with frustro-conical rollers 15, it serves as an excellent device for compaction and smoothing of paving materials such as, for example, asphalt compositions. The compacting action is much superior to that achieved in an ordinary roller because the compaction or squeezing occurs in all directions as the rollers progress over the supporting surface. For certain types of work, it may be preferable to use pneumatic tired wheels of the type shown in Figure 7 in place of the frustro-conical compaction rollers 15. Also the disks of the type shown in Figure 8 may be employed instead of the compaction rollers or pneumatic tired wheels. The substitution of one type of roller for another is readily accomplished by removal of the clamping nut 42 to permit telescopic movement of the rollers relative to the hubs 38. The term "wheel" is used hereinafter to describe any type of wheel, roller, disk, or ground-contacting rotary part.

It is contemplated that a new roadway may be constructed or an old roadway repaired by first using the device with the disks shown in Figure 8. The supporting surface 45 is churned up and thoroughly disked. Oil may then be applied to the disked surface and thoroughly mixed by means of the rotating disks. The pneumatic tired wheels may then be installed to accomplish initial compaction of the oiled mixture. Final compaction and smoothing is accomplished by means of the compaction rollers 15.

Figure 12:
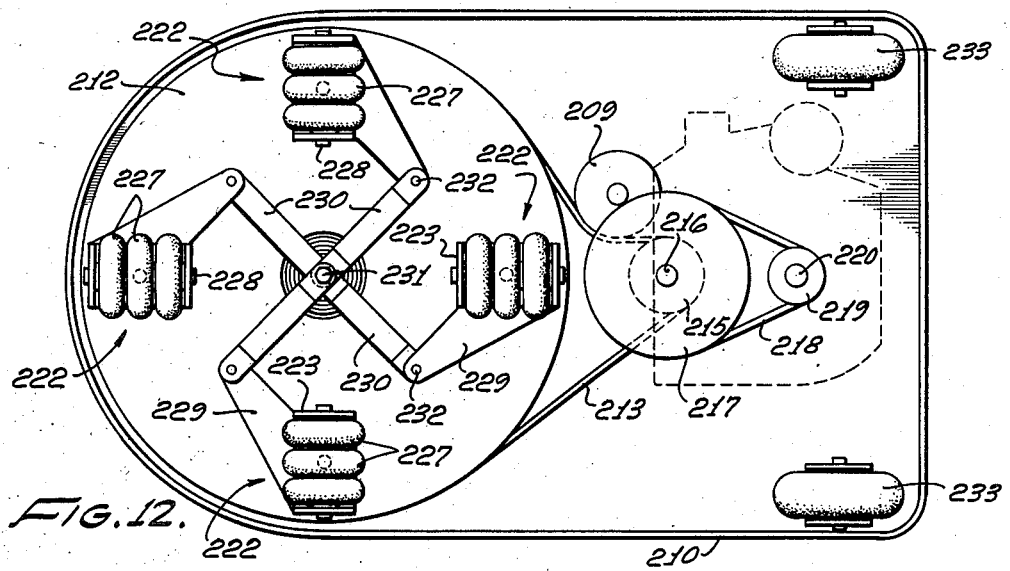
Figure 12 is a bottom plan view of the device shown in Figure 10, the caster wheels being in neutral position so that the frame is maintained in stationary position against movement.

Referring to the modified form of the invention shown in Figures 10–14 of the drawings, a frame generally designated 210 carries a central bearing assembly 211 which supports an annular bull ring 212. The bull ring may be turned by any convenient power means and as shown in the drawings a V-belt 213 engages a groove 214 in the periphery of the ring 212 and this V-belt is driven from a pulley 215 fixed on a jack shaft 216. This jack shaft is rotatably mounted on the frame 210. An idler pulley 209 may engage the belt 213, as shown in Figure 12. Another pulley 217 fixed on the jack shaft 216 is driven by means of a belt 218 from a drive pulley 219 on an output shaft 220 of a prime mover 221. This prime mover 221 is carried on the frame 210 and may comprise an internal combustion engine, an electric motor or any other convenient source of power.

A plurality of caster wheel assemblies, generally designated 222, are mounted on the bull ring 212. Each of these assemblies 222 includes a hanger bracket 223 having a trunnion 224 fixed thereto. The trunnion 224 is mounted to turn within a bore 225 provided in the bull ring 212. An antifriction bearing assembly 226 is interposed between the hanger bracket 223 and the bull ring 212. A plurality of coaxial caster wheels 227 are mounted for independent rotary movement on a shaft 228 carried on the hanger bracket 223.

Means are provided for controlling the swiveling movement of each of the caster wheel assemblies 222 about the axis of its respective trunnion 224. As shown in Figures 11, 12 and 13, this means includes a crank arm 229 fixed to the hanger bracket 223 on each of the assemblies 222. Links 230 connect the arms 229 to a central control element 231. Thus, each link 230 is pivotally connected to the control element 231 and is pivotally connected to an arm 229 by means of a pivot pin 232. The caster wheel assemblies 222 are duplicates and the links 230 are of the same length.

From a consideration of Figures 11 and 12, as thus described, it will be understood that rotary motion of the bull ring 212 does not cause translation of the frame 210 so long as the caster wheel assemblies are in the position as shown in Figure 12. This is true because the rotary axis of each of the caster wheels 227 passes through the axis of the control element 231. The caster wheels 227 simply revolve in a circle as they rest on the floor. The trailer wheels 233, which are carried by the frame 210, also rest on the floor but do not turn so long as the caster wheels 227 continue to roll in concentric circles.

Figure 20:
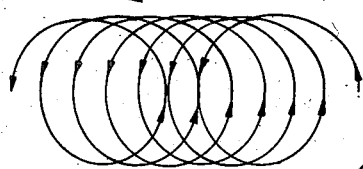
Figure 20 is a schematic diagram showing the path of movement of one of the caster wheels and illustrating the principle of operation of the device.

When the control element 231 is moved to an off-center position with respect to the axis of the bull ring 212, as shown in Figure 13, the caster wheel assemblies 222 are each caused to swivel about the axis of their respective trunnions 224 as the bull ring 212 resolves relative to the frame 210. The result is that, for each revolution of the bull ring 212, each caster wheel assembly travels in a nonuniform and noncircular path. The path for each one of these caster wheel assemblies 222 is shown diagrammatically in Figure 20. For a part of each revolution of the bull ring 212, each caster wheel assembly describes an arc of relatively long radius of curvature and for the remaining portion of the revolution it describes an arc of smaller radius of curvature. The radius of curvature continuously changes and repeats for each revolution of the bull ring 212, for any one position of the control element 231. Each caster wheel assembly thus has a non-circular path with a resulting trend in a direction determined by the position of the control element 231. The result is that when the bull ring 212 rotates in the direction of the arrows 234 as shown in Figure 13, the frame 210 and the entire device moves linearly in the direction of the arrow 235. The direction of linear movement, as shown by the arrow 235, as compared to the off-center position of the control element 231 depends on the lengths and proportions of the links 230 and crank arms 229.

From this description it will be understood that the frame 210 can be caused to "walk" in any desired direction by suitable positioning of the control element 231. When the control element 231 is coincident with the rotary axis of the bull ring 212, the caster wheels 227 roll in concentric circles and no "walking" occurs.

In the particular form of the invention shown in Figure 11, the control element 231 comprises a vertical shank which pivotally receives the links 230. This shank has an enlarged head 236 at its lower end and a nut forming an abutment 237. The links are confined between the head 236 and the abutment 237. The upper end of the shank is formed as a ball 238. This ball is received within a bore 239 in the lower end of a control rod 240. A bracket 241 fixed to the frame 210 provides a socket 242 in which the ball element 243 is received. The ball element is formed as a part of the control rod 240. A spring 244 is positioned within the bracket 241. The upper end of the spring engages a shoulder 245 and the lower end engages a collar 246 formed on the control rod 240. The spring acts to maintain the ball element 243 in engagement with the socket 242 and also acts to move the control rod 240 to a center position. The upper projecting end of the control rod may be moved manually in any direction and the result is to shift the control element 231 to an off-center postion with respect to the rotary axis of the bull ring 212. The device shown in Figures 10–14 is shown primarily to illustrate the principle of operation but it is recognized that this device may be used for many purposes, for example, as the base for a fork truck or for other material handling apparatus. The operator rides on the frame 210 and controls the direction and speed of movement by manually operating the control rod 240. It is to be noted that this is accomplished with a single prime mover and without requiring the employment of a clutch, differential, change speed transmission, reverse gear, or brakes.

Figure 15:
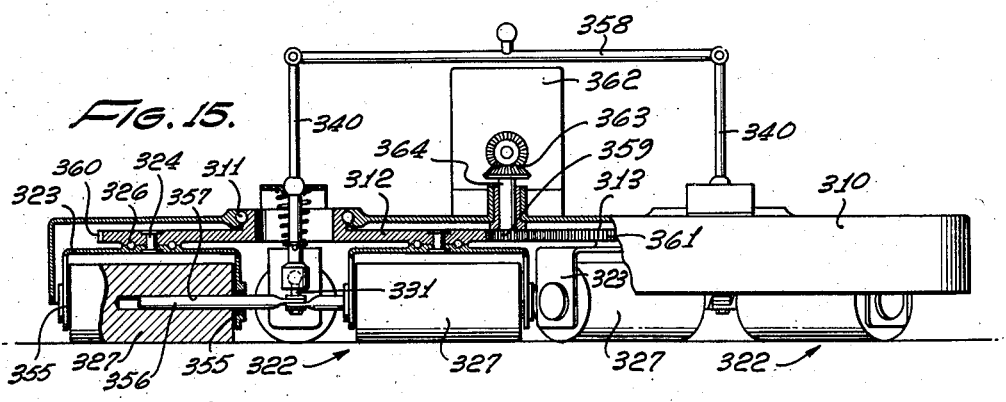
Figure 15 is a side elevation, partly in section, showing a further modified form of my invention, employing two bull rings instead of one.

In the modified form of my invention shown in Figures 15, 16 and 17, two separate bull rings 312 and 313 are employed. These are both carried on a common frame 310 and are rotatably supported on bearing assemblies 311. Each of the bull rings 312 and 313 carries a plurality of caster wheel assemblies 322. These assemblies 322 are substantially duplicates and the bull rings are geared together so that the path of travel of the assemblies 322 on each bull ring intersect and overlap the path of travel of the assemblies 322 on the other bull ring.

Each of the caster wheel assemblies 322 includes a single roller 327 having axially projecting portions 355 mounted to turn within hanger brackets 323. Each of these hanger brackets is mounted to swivel on its respective bull ring by means of a suitable bearing assembly 326 and trunnion 324. Instead of employing crankarms and links, I may provide axles 356 which are slidably received within central axial bores 357 in the rollers 327. Each of these axles 356 is flattened at one end and pivotally received on the shank of a control element 331. Control rods 340 and associated mechanism are each substantially the same as that previously described in connection with Figures 10–14. A single control link 358 may be provided which interconnects the control rods 340 for control at a single location.

In operation, the bull rings 312 and 313 are turned in the same direction by means of a pinion gear 359 which meshes with ring gears 360 and 361. This pinion gear 359 may be driven from a prime mover 362 by means of beveled gearing 363 and shaft 364.

As shown in Figure 16, rotation of the bull rings 312 and 313 in the same direction does not cause any translation of the frame 310 so long as the axis of each control element 331 remains coincident with the axis of rotation of its respective bull ring. When the control elements 331 are shifted to an off-center position with respect to the axis of rotation of their respective bull rings, however, the rollers 327 are caused to assume the positions shown in Figure 17. Each of the rollers then turns about a "false axis" and each hanger bracket 323 and roller 327 is caused to swivel relative to the bull ring as the latter revolves. Each roller has a non-circular path and the trend is in the direction determined by the position of the control element 331. The result is that the entire device, including the frame 310, is caused to "walk" in a direction as determined by the position of the control element 331. The axles 356 telescope in and out of the roller bores 357 as the bull rings revolve. From this description it will be understood that the direction and speed of linear movement of the frame 310 is controlled by the direction and amount of off-center movement imparted to the control elements 331 by the control rods 340.

Figure 14:
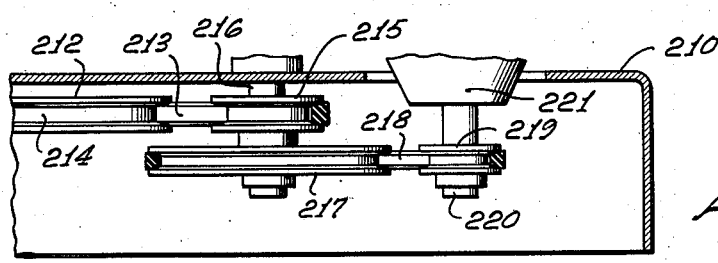
Figure 14 is a sectional detail showing the drive connection between the prime mover and the bull ring.

The apparatus shown in Figures 13, 14 and 15 may employ the crank and link control mechanism of the type shown in Figures 10–14, inclusive, if desired. Similarly the telescoping axial construction shown in Figures 15, 16 and 17 may be substituted for the crank and link control mechanism shown in Figures 10–14, inclusive, if desired.

While only two bull rings are shown and described in connection with the device of Figures 15–17, it will be understood that a great number of bull rings, each carrying a plurality of caster wheel assemblies, may be employed if desired. It is believed that devices of this general type may have particular usefulness in connection with the compacting of asphalt or other surfaces and may find use in apparatus for constructing roads, highways, airstrips and the like. Smaller forms of the invention may advantageously be used for the mixing and kneading of materials.

A toothed roller 370, shown in Figure 18, may be substituted for the rollers 327 for some commercial applications of the machine. Toothed rollers of this type may be useful in breaking up clods in agricultural work. Furthermore, the provision of such toothed rollers, each tooth carrying a deposit of hard metal such as, for example, tungsten carbide, may enable the machine to serve as a surfacing or grinding instrument for removing undesirable projections or eminences from a road or highway or other substantially flat surface. The ability of the device to move in any direction at any desired speed or to remain stationary while the bull rings turn makes it particularly desirable for this type of surface finishing work.

Roller 375, shown in Figure 19, may be substituted for the rollers 327 if desired for use in agricultural tools. This roller, having a plurality of disks, provides an action similar to that of a harrow but accomplishes more effective mixing of the earth or other loose material. A device of the type shown in Figure 15 accompanied with rollers 375 would be capable of breaking up and disking soils which could not be broken up in any other conventional disking action.

The device as shown in Figures 10–14, inclusive, may find usefulness as an amusement device to be ridden by one or more persons. The device as shown in Figures 15–17 may be used to mix road paving materials in situ. Other examples of the usefulness of this invention will occur to those skilled in the art.

Having full described my invention, it is to be understood that I do not wish to be limited to the details herein set forth but my invention is of the full scope of the appended claims.

I claim:

1. In a device of the class described, the combination of: a frame, a rotary member mounted to turn on the frame about a vertical axis, a pair of trunnions each pivotally mounted on the rotary member for movement about a vertical axis laterally offset with respect to the first said axis, the trunnions each having an outwardly projecting axle and an inwardly projecting slotted shank, a wheel mounted upon each axle and adapted to roll upon a flat surface, means adapted to be laterally spaced from said first axis and extending through said slotted shanks for cyclically pivoting the said trunnions relatively to the rotary member in timed relation with each revolution of the rotary member, whereby said wheels are caused to travel in non-circular paths on said surface, control means mounted centrally of the axis of said rotary member to control the spacing of said spaced means from said first axis, and means for rotatably shifting said control means about said first axis.

2. The combination set forth in claim 1 in which each trunnion shank is provided with antifriction bearing means contacting a portion of the rotary member.

3. In a motion converting device of the class described, the combination of: a frame, a ring rotatably mounted on the frame, a plurality of caster wheel assemblies mounted on the ring, each of the assemblies including a member mounted to swivel on the ring and having at least one caster wheel rotatably mounted thereon, a control element adapted to be laterally spaced from the axis of said ring, control means mounted centrally of the axis of said ring to control the spacing of said spaced means and to rotatably shift said control element about the axis of said ring, and linkage engaging the control element and each of said assemblies for imparting swivelling movement to said members during rotary movement of the ring.

4. In a motion converting device of the class described, the combination of: a frame, a ring rotatably mounted on the frame, power means on the frame for turning the ring, a plurality of caster wheel assemblies mounted on the ring, each of the assemblies including a hanger mounted to swivel on the ring and having a caster wheel rotatably mounted on the hanger and adapted to roll upon a flat surface, means for controlling the swivelling movement of the hangers during rotary movement of the ring, said means including a control element adapted to be laterally spaced from the axis of the ring, control means mounted centrally of the axis of said ring to control the spacing of said spaced means and to rotatably shift said control element about the axis of said ring, and connecting means engaging said control element and each of said assemblies for imparting swivelling movement to said members during rotary movement of the ring.

5. The combination set forth in claim 4 in which each hanger is provided with a crank arm, said connecting means including a pivotal link between the control element and each crank arm.

6. The combination set forth in claim 4 in which said connecting means comprises an axle telescopically received within a central axial bore in each caster wheel, said axles being pivotally connected to the control element.

7. The combination set forth in claim 4 in which the frame is provided with a pair of trailer wheels.

8. In a device of the class described, the combination of: a frame, a rotary member mounted to turn on the frame about a certain axis, a plurality of wheel-supporting elements each pivotally mounted on the rotary member for movement about an axis parallel to the first said axis, a wheel mounted upon each element and adapted to roll upon a flat surface, a power unit having a part adapted to be offset relative to said certain axis and movable radially of said rotary member and operatively connected to each of said elements, a support for the power unit mounted coaxially of the rotary member, means for producing rotary movement of said power unit, and means for actuating the power unit.

9. In a device of the class described, the combination of: a frame, a rotary member mounted to turn on the frame about a certain axis, a plurality of wheel-supporting elements each pivotally mounted on the rotary member for movement about an axis parallel to the first said axis, a wheel mounted upon each element and adapted to roll upon a flat surface, means for cyclically pivoting the said elements relative to the rotary member in timed relation with each revolution of the rotary member, whereby said wheels are caused to travel in non-circular paths on said surface, said means including a power cylinder assembly having a part movable radially of said rotary member and operatively connected to each of said elements, a tubular support for the power cylinder assembly mounted coaxially of the rotary member for relative rotary movement with respect thereto, means for turning the support, and means extending within the support for actuating the power cylinder assembly.

10. In a device of the class described, the combination of: a frame, a rotary member mounted to turn on the frame about a certain axis, a plurality of wheel-supporting elements each pivotally mounted on the rotary member for movement about an axis parallel to the first said axis, a wheel mounted upon each element and adapted to roll upon a flat surface, each element also having a slotted shank, a control pin engaging each slotted shank, a power cylinder assembly having an extensible rod movable radially of said rotary member and fixed to said control pin, a support for the power cylinder assembly mounted coaxially of the rotary member for relative rotary movement with respect thereto, means for turning the support, and means extending within the support for actuating the power cylinder assembly.

11. In a device of the class described, the combination of: a frame, a rotary ring member mounted to turn on the frame about a vertical axis, a plurality of trunnion elements each pivotally mounted on the rotary ring member for movement about a vertical axis offset from the first said axis, a wheel mounted upon each trunnion element and adapted to roll upon a flat surface, each trunnion element having a slotted shank, a vertical control pin engaging each of the slotted shanks and guided for radial movement, a power cylinder assembly having an extensible rod fixed to said control pin, a tubular support for the power cylinder assembly; bearing means for mounting the tubular support coaxially on the rotary ring member, means for turning the support, and means extending within the support for actuating the power cylinder assembly.

12. In a device of the class described, the combination of: a frame, a pair of rotary members mounted to turn on the frame about laterally spaced parallel axes, power means on the frame for turning the rotary members in opposite directions at the same speed, each of the rotary members having a plurality of wheel-supporting elements each pivotally mounted thereon for movement about an axis parallel to the axis of its respective rotary member, a wheel mounted upon each element and adapted to roll upon a flat surface, a tubular support mounted for angular adjustment coaxially of each of the rotary members, a guide block fixed to one end of each tubular support, a slide member guided for radial movement on each block, a control pin fixed to each guide member and engaging the wheel-supporting elements on its respective rotary member and adapted to control the pivotal action of said elements, power means for independent shifting movement of the slide members, and coordinated means for simultaneously turning the tubular supports.

13. In a device of the class described, the combination of: a frame, a plurality of rings each rotatably mounted on the frame, power means on the frame for turning the rings, a plurality of caster wheel assemblies mounted on each ring, each of the assemblies including a hanger mounted to swivel on its respective ring and having at least one caster wheel rotatably mounted on the hanger and adapted to roll upon a flat surface, and means for controlling the swivelling movement of the hangers during rotary movement of the rings, said means including a member adapted to occupy a position coinciding with the axis of rotation of said rings or shiftable to a position laterally offset relative thereto, means to connect said member to each of said assemblies for swivelling thereof, and control means mounted centrally of the axis of rotation of said rings to control the position of said member and to rotatably shift said member about said axis.

14. In a device of the class described, the combination of: a frame, a rotary member mounted on the frame to turn about a rotary axis, a wheel-supporting element pivotally mounted on the rotary member for movement about a pivotal axis parallel to the said rotary axis, a wheel turnably mounted upon said element, means adapted to be spaced laterally of said rotary axis and connected with said wheel-supporting elements for cyclically pivoting the said element relative to the rotary member in timed relation with each revolution of the rotary member, control means mounted centrally of said rotary axis to control the spacing of said spaced means from said rotary axis and to rotatably shift said spaced means relative to said rotary axis, whereby the wheel is caused to travel in a non-circular path with a trend in any desired direction.

15. In a device of the class described, the combination of: a frame, a rotary member mounted on the frame to turn about a rotary axis, a plurality of wheel-supporting elements each pivotally mounted on the rotary member for movement about a pivotal axis parallel to the said rotary axis, a wheel turnably mounted upon each element, means adapted to be spaced laterally of said rotary axis and connected with said wheel-supporting elements for cyclically pivoting the said elements relative to the rotary member in timed relation with each revolution of the rotary member, control means mounted centrally of said rotary axis to control the spacing of said spaced means from said rotary axis and to rotatably shift said spaced means relative to said rotary axis, whereby the wheels are caused to travel in non-circular paths with a trend in any desired direction.

16. In a device of the class described, the combination of: a frame, a rotary member mounted on the frame to turn about a vertical rotary axis, a wheel-supporting trunnion pivotally mounted on the rotary member for movement about a vertical pivotal axis parallel to the said rotary axis, the trunnion having an outwardly projecting axle and an inwardly projecting shank, a wheel turnably mounted upon said axle and adapted to roll upon a supporting surface, means adapted to be spaced laterally of said rotary axis and connected with said inwardly projecting shank for cyclically pivoting the said trunnion relative to the rotary member in timed relation with each revolution of the rotary member, control means mounted centrally of said rotary axis to control the spacing of said spaced means from said rotary axis and to rotatably shift said spaced means relative to said rotary axis, whereby the wheel is caused to travel in a non-circular path with a trend in any desired direction.

17. In a device of the class described, the combination of: a frame, a rotary member mounted on the frame to turn about a vertical rotary axis, a plurality of wheel-supporting trunnions each pivotally mounted on the rotary member for movement about a pivotal axis parallel to the said rotary axis, each trunnion having an outwardly projecting axle and an inwardly projecting shank, a wheel turnably mounted upon each axle, means adapted to be spaced laterally of said rotary axis and connected with said inwardly projecting shanks for cyclically pivoting the said trunnions relative to the rotary member in timed relation with each revolution of the rotary member, control means mounted centrally of said rotary axis to control the spacing of said spaced means from said rotary axis and to rotatably shift said spaced means relative to said rotary axis, whereby the wheels are caused to travel in non-circular paths with a trend in any desired direction.

18. In a device of the class described, the combination of: a frame, a pair of rotary members each mounted on the frame to turn about laterally spaced axes, each member having a plurality of wheel-supporting elements each pivotally mounted thereon for movement about an individual pivotal axis, a wheel turnably mounted upon each of said elements, means for cyclically pivoting the said elements relative to their respective rotary members in timed relation with each revolution thereof, said means including a pair of non-rotary adjustable parts, one mounted on the frame centrally of each rotary member for movement in all directions normal to the rotary axis of that member, and connected to the wheel-supporting elements, a single control element on the frame for moving both said non-rotary parts simultaneously, whereby the wheels are caused to travel in a non-circular path with a trend in any desired direction.

19. In a device of the class described, the combination of: a frame, a pair of rotary members each mounted on the frame to turn about laterally spaced rotary axes, each member having a plurality of wheel-supporting elements each pivotally mounted thereon for movement about an individual pivotal axis, a wheel turnably mounted upon each of said elements, means for cyclically pivoting the said elements relative to their respective rotary members in timed relation with each revolution thereof, said means including each rotary member having a control pin engaging each of said wheel-supporting elements on that member and guided for radial movement, a power cylinder assembly having an extensible rod fixed to each control pin, an angularly adjustable tubular support for each power cylinder assembly mounted coaxially of each rotary member, and common control means on the frame for turning both tubular supports simultaneously.

20. The combination of claim 19 in which means are provided on the frame for independently actuating said power cylinder assemblies.

References Cited in the file of this patent

UNITED STATES PATENTS

| | | |
|---|---|---|
| 915,752 | Edlund | Mar. 23, 1909 |
| 992,730 | Allen | May 16, 1911 |
| 1,773,992 | Gillis | Aug. 26, 1930 |
| 2,419,308 | Austin | Apr. 22, 1947 |
| 2,619,017 | Stephenson | Nov. 25, 1952 |
| 2,706,875 | Higley | Apr. 26, 1955 |

FOREIGN PATENTS

| | | |
|---|---|---|
| 648,597 | Germany | Aug. 7, 1937 |